US012717042B2

(12) United States Patent
Rangesh et al.

(10) Patent No.: US 12,717,042 B2
(45) Date of Patent: Aug. 25, 2026

(54) OBJECT TRACKING BASED ON UNUSED SENSOR DATA

(71) Applicant: GM Cruise Holdings LLC, San Francisco, CA (US)

(72) Inventors: Akshay Rangesh, Mountain View, CA (US); Logan Perreault, Billings, MT (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 848 days.

(21) Appl. No.: 18/159,000

(22) Filed: Jan. 24, 2023

(65) Prior Publication Data

US 2024/0248212 A1 Jul. 25, 2024

(51) Int. Cl.
*G01S 17/931* (2020.01)
*G01S 13/86* (2006.01)

(52) U.S. Cl.
CPC .......... *G01S 17/931* (2020.01); *G01S 13/865* (2013.01); *G01S 13/867* (2013.01)

(58) Field of Classification Search
CPC ...... G01S 17/931; G01S 13/60; G01S 13/726; G01S 13/865; G01S 13/867; G01S 13/931
USPC .......................................................... 356/4.1
See application file for complete search history.

(56) References Cited

U.S. PATENT DOCUMENTS 10,468,062 B1 * 11/2019 Levinson ............... G11B 20/18
11,022,974 B2 * 6/2021 Levinson ............. G05D 1/0276
11,531,113 B1 * 12/2022 Bristow ................. G06V 20/58
12,319,320 B2 * 6/2025 Gyllenhammar ....... G01S 15/86
2017/0031015 A1 * 2/2017 Mei ....................... G01S 13/931
2018/0120842 A1 * 5/2018 Smith ..................... G01S 7/412
2018/0232947 A1 * 8/2018 Nehmadi ................ G01S 7/295
2020/0103523 A1 * 4/2020 Liu ......................... G01S 13/87
2020/0377090 A1 * 12/2020 Seccamonte ....... B60W 60/0011
2021/0101624 A1 * 4/2021 Philbin ................ G05D 1/0274
2022/0137207 A1 * 5/2022 Song ..................... G01S 13/931
342/55
2022/0204029 A1 * 6/2022 Chen ...................... G01S 17/42

(Continued)

FOREIGN PATENT DOCUMENTS

CN 114670851 A * 6/2022 ............ B60W 40/10
CN 115375728 A * 11/2022 .......... G06F 18/2113

(Continued)

*Primary Examiner* — Atul Trivedi

(74) *Attorney, Agent, or Firm* — CANTOR COLBURN LLP

(57) ABSTRACT

Systems and techniques are provided for generating a secondary track based on unused sensor data of an autonomous vehicle (AV). An example method can include receiving unused sensor data collected by one or more sensors of an AV. The unused sensor data can be a remainder of sensor data that is used for generating a primary track of one or more objects. Also, the unused sensor data can include a detection of an object. The example method can further include validating the object that is detected in the unused sensor data based on one or more parameters associated with the object, comparing the object detected in the unused sensor data with the one or more objects of the primary track for similarity, determining kinematics of the object based on a geometry of the object, and generating a secondary track of the object for localization of the AV.

17 Claims, 6 Drawing Sheets

(56) References Cited

U.S. PATENT DOCUMENTS

| | | | | |
|---|---|---|---|---|
| 2022/0227367 | A1* | 7/2022 | Kario | G06V 40/103 |
| 2022/0308195 | A1* | 9/2022 | Zeng | G01S 13/003 |
| 2022/0357453 | A1* | 11/2022 | Zhou | G01S 17/89 |
| 2022/0373654 | A1* | 11/2022 | Benscoter | G01S 7/484 |
| 2022/0374734 | A1* | 11/2022 | Chen | G06N 5/04 |
| 2022/0379924 | A1* | 12/2022 | Foster | B60W 30/16 |
| 2022/0390597 | A1* | 12/2022 | Wang | G01S 13/931 |
| 2023/0015218 | A1* | 1/2023 | Droz | G01S 17/931 |
| 2023/0054759 | A1* | 2/2023 | Robinson | G01S 17/931 |
| 2023/0192145 | A1* | 6/2023 | Das | B60W 60/0027 |
| 2024/0248212 | A1* | 7/2024 | Rangesh | G01S 13/60 |
| 2024/0367686 | A1* | 11/2024 | Gunbatar | B60W 30/0953 |
| 2025/0018954 | A1* | 1/2025 | Boydston | G01S 17/931 |
| 2025/0178596 | A1* | 6/2025 | Panigrahi | B60W 30/18054 |
| 2025/0341403 | A1* | 11/2025 | Schroeter | G01C 21/3826 |

FOREIGN PATENT DOCUMENTS

| | | | | | |
|---|---|---|---|---|---|
| CN | 116609777 | A | * | 8/2023 | G01S 13/931 |
| CN | 112789481 | B | * | 10/2024 | G06V 20/584 |
| DE | 102021126527 | A1 | * | 4/2023 | G01S 13/931 |
| EP | 4043921 | A1 | * | 8/2022 | G01S 13/66 |
| EP | 4082862 | A1 | * | 11/2022 | G06V 20/56 |
| JP | 2022552138 | A | * | 12/2022 | G06V 20/58 |
| JP | 2022552938 | A | * | 12/2022 | B60W 50/14 |
| JP | 2025527493 | A | * | 8/2025 | G01S 17/931 |
| KR | 102897629 | B1 | * | 12/2025 | G06N 3/088 |
| WO | WO-2025221302 | A1 | * | 10/2025 | G01S 17/34 |

* cited by examiner

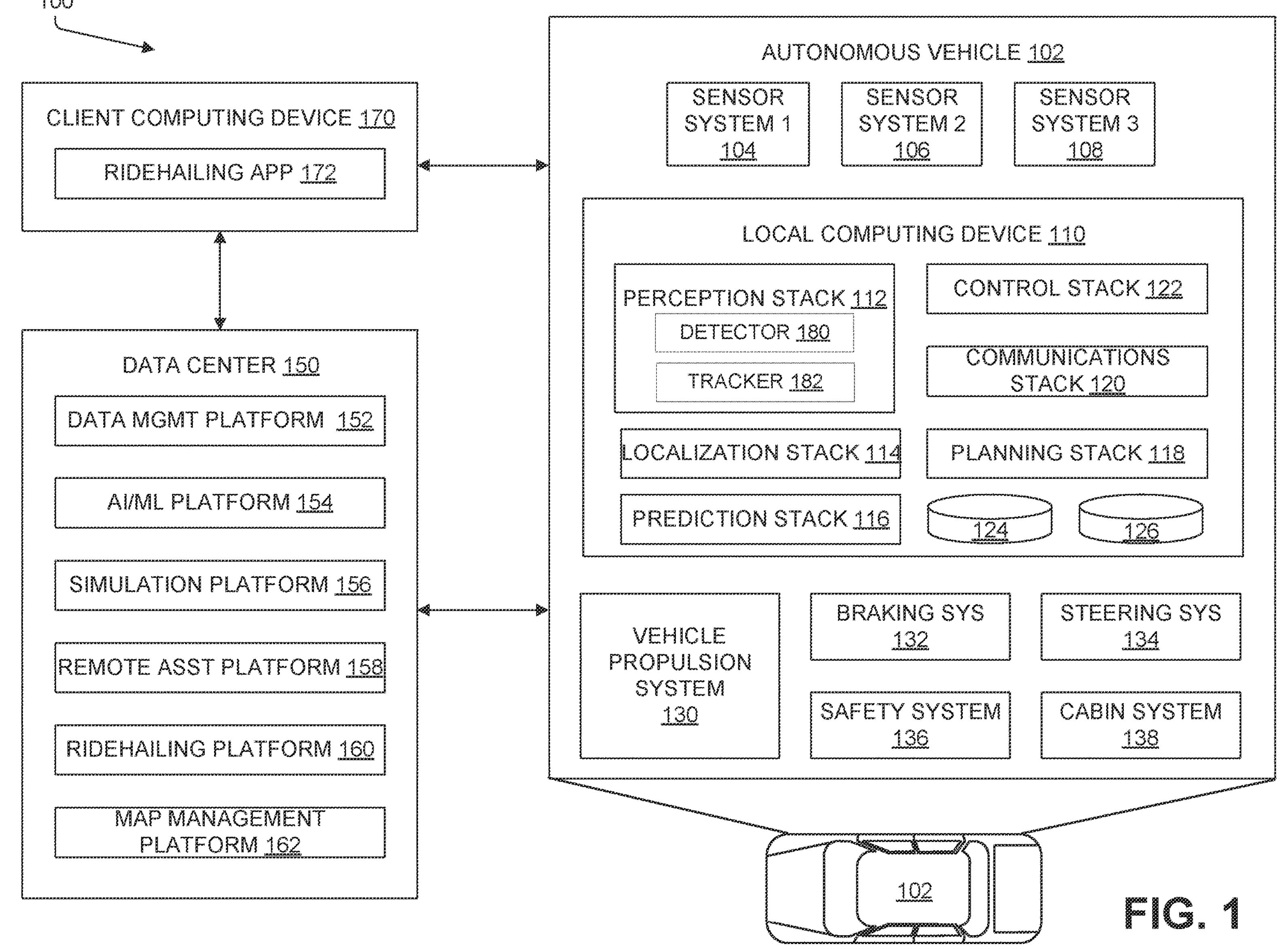
100
AUTONOMOUS VEHICLE 102
SENSOR SYSTEM 1 104
SENSOR SYSTEM 2 106
SENSOR SYSTEM 3 108
LOCAL COMPUTING DEVICE 110
PERCEPTION STACK 112
DETECTOR 180
TRACKER 182
CONTROL STACK 122
COMMUNICATIONS STACK 120
LOCALIZATION STACK 114
PLANNING STACK 118
PREDICTION STACK 116
124
126
VEHICLE PROPULSION SYSTEM 130
BRAKING SYS 132
STEERING SYS 134
SAFETY SYSTEM 136
CABIN SYSTEM 138
102
CLIENT COMPUTING DEVICE 170
RIDEHAILING APP 172
DATA CENTER 150
DATA MGMT PLATFORM 152
AI/ML PLATFORM 154
SIMULATION PLATFORM 156
REMOTE ASST PLATFORM 158
RIDEHAILING PLATFORM 160
MAP MANAGEMENT PLATFORM 162
FIG. 1

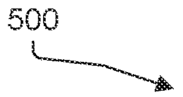
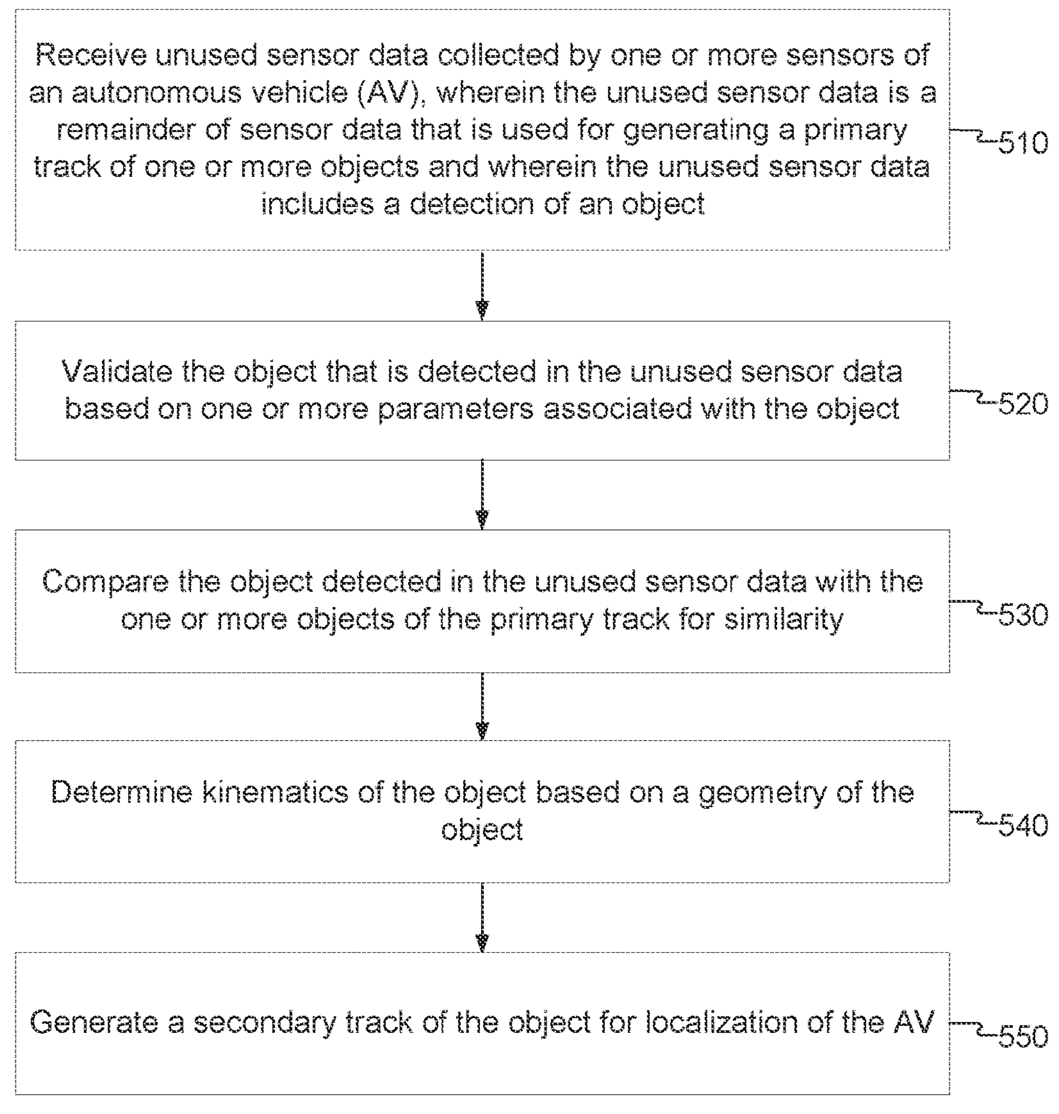
FIG. 5

OBJECT TRACKING BASED ON UNUSED SENSOR DATA

TECHNICAL FIELD

The present disclosure generally relates to a perception system of autonomous vehicles and, more specifically, generating a secondary track of an object based on unused sensor data of an autonomous vehicle.

BACKGROUND

An autonomous vehicle is a motorized vehicle that can navigate without a human driver. An exemplary autonomous vehicle can include various sensors, such as a camera sensor, a light detection and ranging (LiDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1 illustrates an example system environment that can be used to facilitate autonomous vehicle (AV) dispatch and operations, according to some aspects of the disclosed technology;

FIG. 5 illustrates a flowchart illustrating an example process for generating a secondary track based on unused detections, according to some examples of the present disclosure.

DETAILED DESCRIPTION

Figure 2:
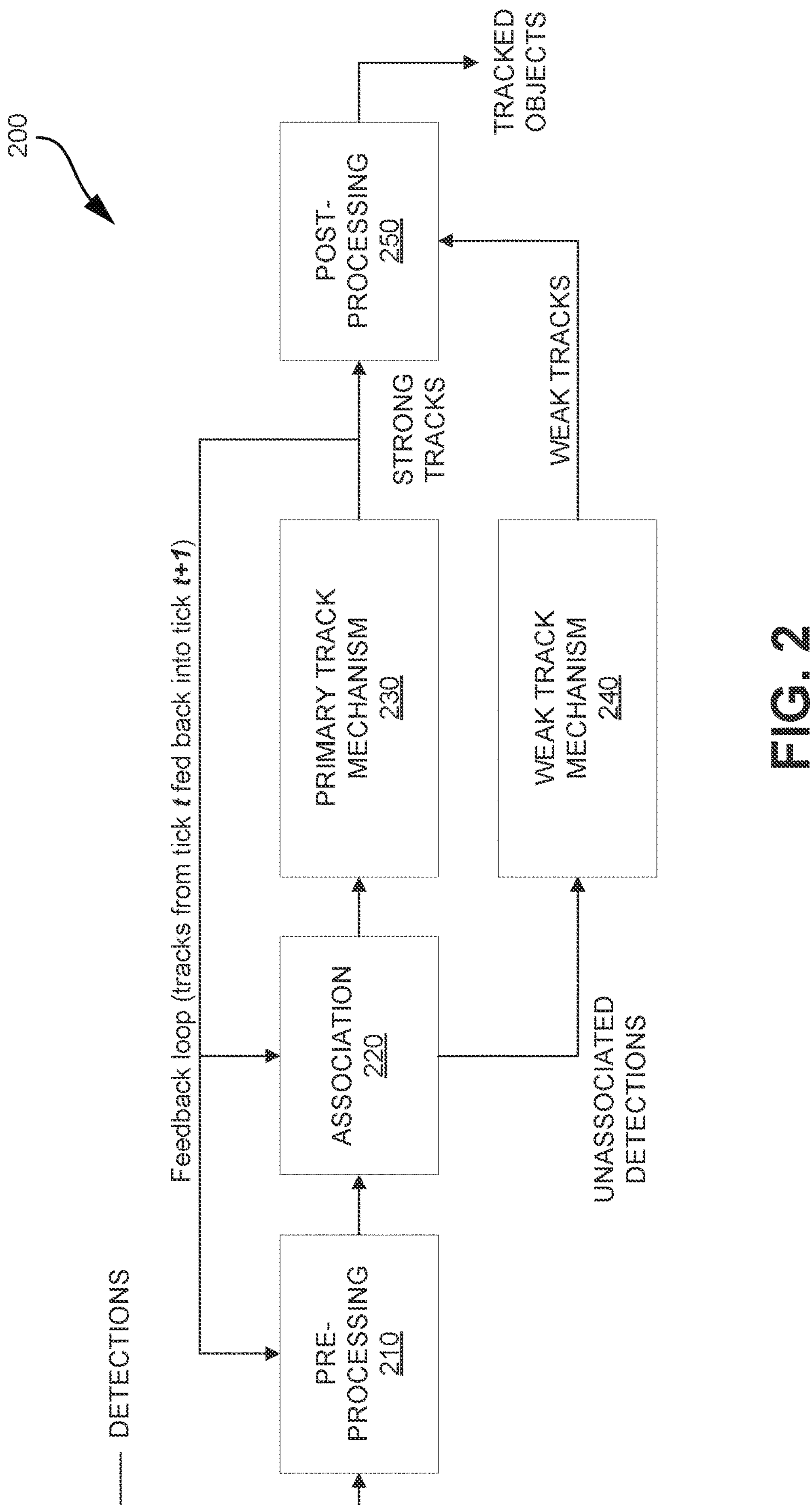
FIG. 2 illustrates a diagram illustrating an example object tracking pipeline, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, an Inertial Measurement Unit (IMU), a light detection and ranging (LiDAR) sensor, a radio detection and ranging (RADAR) sensor, an audio sensor, amongst others, which the AVs can use to collect data and measurements that the AVs can use for operations such as navigation. The AVs can use the various sensors to collect data and measurements that the AVs can use for AV operations such as perception (e.g., object/event detection, tracking, localization, sensor fusion, point cloud processing, image processing, etc.), planning (e.g., route planning, trajectory planning, situation analysis, behavioral and/or action planning, mission planning, etc.), prediction (e.g., motion prediction, behavior prediction, etc.), control (e.g., steering, braking, throttling, lateral control, etc.), etc. The sensors can provide the data and measurements to an internal computing system of the AV, which can use the data and measurements to control a mechanical system of the AV, such as a vehicle propulsion system, a braking system, or a steering system.

To ensure safe and efficient operations, AVs are required to accurately perceive the driving environment (e.g., objects that may be present around the AVs). In other words, object tracking is crucial to ensure accurate and efficient autonomous driving. The identification and tracking of objects (e.g., vehicles, pedestrians, and various objects and obstacles) is crucial to fully understand and account for predicted changes in the driving environment. Some AV tracking systems operate within a tracking-by-detection paradigm. For example, a detector of a tracking system can output object detections based on information provided by other components of an AV and a tracker of the tracking system can associate these object detections across time to generate tracks. However, a tracker is occasionally prone to false negative associations. For example, a tracker can fail to associate a true positive detection to an existing track or generate a new track. Since a downstream planning system only consumes object tracks and not the detections themselves, this can result in unaccounted risk from the true positive detection. If every detection is consumed to generate a track, there could be a high number or increased probability of false positives. On the other hand, if the threshold for a detection to be used in generating a track is too high, there is a high likelihood that a true positive detection can get lost.

Described herein are systems, apparatuses, processes (also referred to as methods), and computer-readable media (collectively referred to as "systems and techniques") for generating a weak track (e.g., a secondary track) of an object based on unused sensor data. More specifically, the systems and techniques described herein can generate a secondary track of an object based on unused detections that are not used in generating a primary track. In some examples, the secondary track based on unused detections can be presented as a probabilistic representation (e.g., a low confidence) so that an over-reaction can be avoided while providing enough signal for an AV to start preparing for any possible risk. As follows, the systems and techniques can convey early risk to a prediction stack and/or a planning system of an AV to facilitate precautionary behavior and not wait until enough historical data is accumulated to form a primary track with a high confidence/certainty.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LiDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.).

In some examples, the perception stack 112 can comprise a detector 180 and a tracker 182. The detector 180 can detect and classify objects that may be present around the AV 102 and/or captured by the sensor systems 104-108. The tracker 182 can determine the detected objects' current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 (e.g., the detector 180 and the tracker 182) can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 114 can determine the AV's position and orientation (pose) using different methods from multiple systems (e.g., GPS, IMUs, cameras, LiDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LiDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LiDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service (e.g., a ridesharing service) via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehailing application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

FIG. 2 illustrates a diagram illustrating an example object tracking pipeline 200. In some cases, a perception system (e.g., perception stack 112 as illustrated in FIG. 1) can comprise multiple components such as an object detector (e.g., detector 180) and an object tracker (e.g., tracker 182). In some examples, an object detector can receive sensor data from one or more sensors of an AV (e.g., sensor systems 104-108 such as a camera, a LiDAR sensor, a RADAR sensor, etc.) and detect objects captured in the sensor data. For example, detector 180 can receive sensor data from various sensors of AV 102 as input and output detections of object(s) such as vehicles, pedestrians, or other objects or obstacles in the proximity of AV 102.

As shown in FIG. 2, at pre-processing 210, detections based on sensor data from various sensors of an AV can be pre-processed. In some examples, the pre-processing of the detections can include, without limitation, image preprocessing, resizing of the sensor data, removal of noise (e.g., denoise), background subtraction, and so on.

In some aspects, at association 220, some pre-processed detections can be associated with an existing track or selected to be associated with a new strong/primary track. For example, a set of detections that may be associated with an existing or a new strong/primary track can be provided to primary track mechanism 230 while remaining detections can be provided to weak track mechanism 240. For example, detections that are not associated with an existing track or not selected to be associated with a new strong/primary track (e.g., unused sensor data) can be provided to weak track mechanism 240. In some examples, the selection of detections whether to be provided to primary track mechanism 230 or weak track mechanism 240 can be based on a predetermined parameter or a threshold relating to, for example, a confidence score, a safety score, etc. For example, if a confidence score of a particular detection exceeds a threshold confidence score, the detection can be provided to primary track mechanism 230. If a confidence score is lower than a threshold confidence score, the detection can be provided to weak track mechanism 240.

In some examples, primary track mechanism 230 can include kinematic refinement, geometric refinement, motion classification, and semantic classification to output a strong/primary track, which can then be provided to post-processing 250.

In some examples, unassociated detections that are left over from association 220 (e.g., unused sensor data) can be provided to weak track mechanism 240. The unassociated detections (e.g., unassociated observations, leftover observations, etc.) can be the remainder of detections that do not contribute to a published primary (or strong) track. For example, weak track mechanism 240 can transform a subset of the unassociated detections in tracking into a track that conveys a potential risk. Details of weak track mechanism 240 are further provided below with respect to FIG. 3.

In some cases, the output of primary track mechanism 230 (e.g., strong tracks) and the output of weak track mechanism 240 (e.g., weak tracks) can be provided to post-processing 250. At post-processing 250, the systems and techniques of the present disclosure can generate tracked objects. In contrast to strong tracks that are generated from primary track mechanism 230 (e.g., with a probability of 1.0), a weak track can be in a probabilistic representation, for example, to indicate uncertainties (or a degree of uncertainties) (e.g., with a probability less than 1.0). Based on the probability or uncertainties of weak tracks, a behavior of an AV can be adjusted accordingly, for example, by localization stack 114 for localizing/re-localizing AV 102, or planning stack 118 for routing/re-routing AV 102.

In some examples, while strong tracks can be fed back into the next tick t+1, the systems and techniques described herein may not feed the weak tracks back into the next tick t+1. As a result, future detections may not be associated with weak tracks. Instead, future detections may trigger a new strong/primary track to be generated that can trigger deduplication to remove the weak track. In some cases, the weak track can be short-lived compared to definite strong tracks.

In some examples, weak track mechanism 240 can be a separate system or a parallel system in addition to primary track mechanism 230. In some aspects, weak track mechanism 240 does not interfere with existing tracking behavior (e.g., primary track mechanism 230 for generating strong tracks). For example, weak track mechanism 240 does not remove detections or observations that may be associated with primary track mechanism 230.

Figure 3:
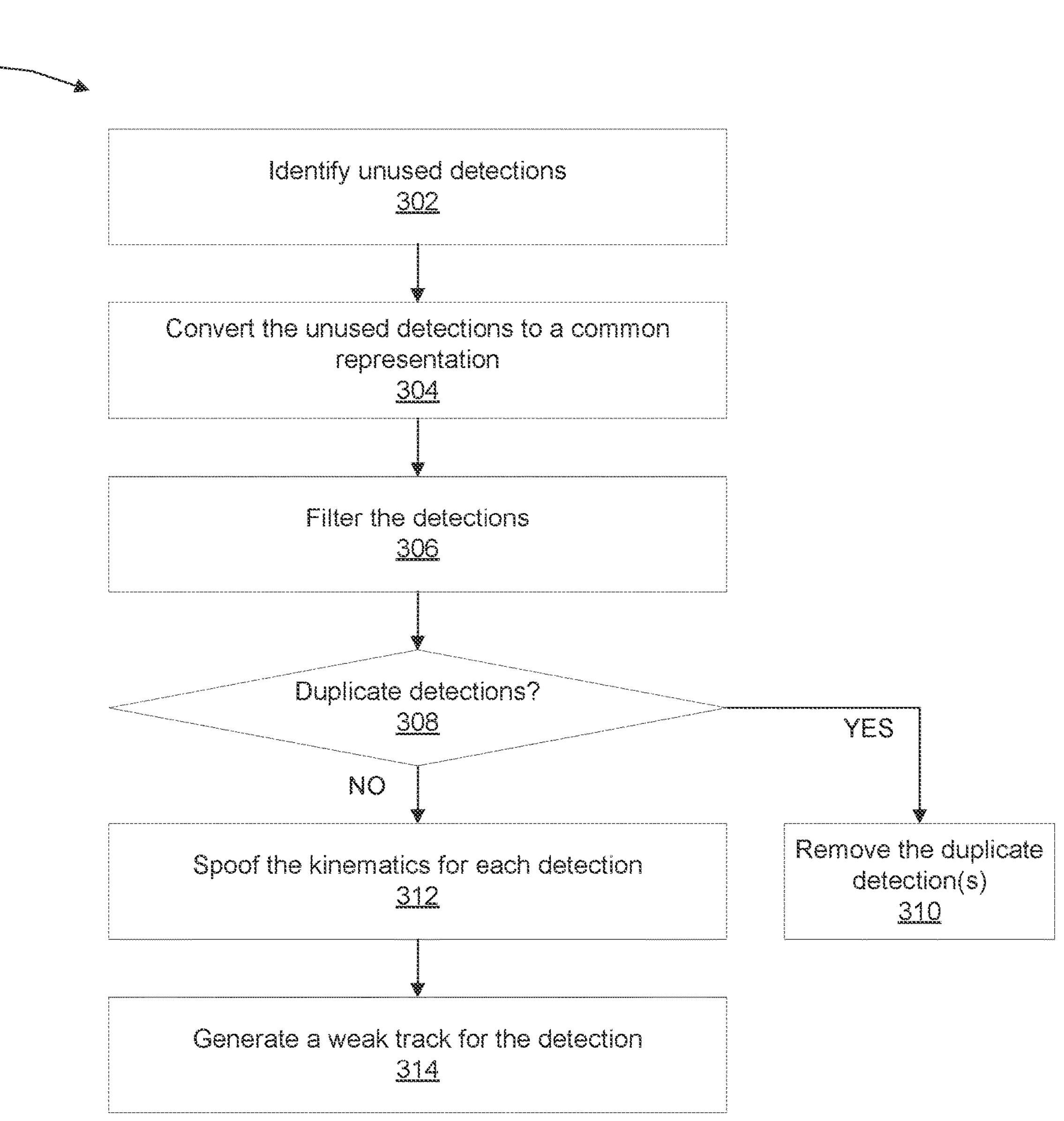
FIG. 3 illustrates a flowchart illustrating an example process of a weak track mechanism, according to some examples of the present disclosure.

FIG. 3 illustrates a flowchart illustrating an example process 300 of a secondary track mechanism. As illustrated previously, process 300 of a secondary track mechanism (similar to weak track mechanism 240) can generate a weak/secondary track that captures the potential risk associated with an unused/leftover detection by transforming and representing the unused detection into a weak/secondary track that can be consumed by a planning system of an AV. Although the example process 300 depicts a particular sequence of operations, the sequence may be altered without departing from the scope of the present disclosure. For example, some of the operations depicted may be performed in parallel or in a different sequence that does not materially affect the function of process 300. In other examples, different components of an example device or system that implements process 300 may perform functions at substantially the same time or in a specific sequence.

At block 302, the systems and techniques described herein can identify unused/unassociated detections (e.g., unused sensor data). In some cases, the systems and techniques of the present disclosure can look at detections that are published by a detector (e.g., detector 180 of AV 102) or based on sensor data from various sensors (e.g., sensor systems 104-108 of AV 102). In some examples, the systems and techniques of the present disclosure can receive unused/unassociated detections from a tracker (e.g., tracker 182 of AV 102). For example, after association 220 of object tracking pipeline 200 as illustrated in FIG. 2, the systems and techniques of the present disclosure can identify unused/unassociated detections that have not been associated with an existing or new track through primary track mechanism 230 (e.g., unused sensor data).

At block 304, the systems and techniques described herein can convert the unused detections (e.g., unused sensor data) to a common representation. In some examples, the detections are based on sensor data collected from various sensors of an AV (e.g., sensor systems 104-108 of AV 102 as illustrated in FIG. 1). As the sensor data from each of the sensors can be in a different format (e.g., LiDAR point cloud data, image data from a camera etc.), the systems and techniques of the present disclosure can convert the detections from different sources/sensors into a common data structure so that the detections can be processed in a sensor-agnostic manner.

At block 306, the systems and techniques described herein can filter the unused detections (e.g., unused sensor data) based on one or more criteria. In some examples, in order to exclude false positive detections and/or irrelevant detections, the systems and techniques of the present disclosure can filter the unused detections based on one or more parameters such as a confidence score, a semantic class, and/or a location in relation to an AV.

In some examples, the unused detections can be filtered based on a confidence score. In some cases, when an object detector (e.g., detector 180 as illustrated in FIG. 1) detects an object, the object detector can output a confidence score of the object. If a confidence score of a particular unused detection is lower than a threshold confidence score for a secondary track, the systems and techniques of the present disclosure can exclude the particular unused detection from generating a secondary track. In some cases, the threshold confidence score for filtering the unused detections can be lower than the threshold confidence score for selecting detection(s) for a primary/strong track.

In some cases, the unused detections can be filtered based on a semantic class of an unused detection (e.g., detected object). For example, the systems and techniques of the present disclosure can remove certain semantic classes that may not lead to a safety critical event (e.g., a collision or a near miss with an AV) or may pose an insignificant danger. In some examples, the systems and techniques of the present disclosure can keep detections of certain semantic classes for generating a secondary track. Non-limiting examples of a semantic class for generating a secondary track can include vehicles, vulnerable road users (VRUs) such as pedestrians or bicyclists, animals, and so on.

In some aspects, the unused detections can be filtered based on a location in relation to an AV. For example, if the distance between the detected object and AV 102 exceeds a threshold distance, the systems and techniques of the present disclosure can remove the detected object from generating a secondary track since there may be a low risk or the detected object does not pose an immediate danger and/or risk to an AV 102.

At block 308, the systems and techniques described herein can determine if the unused detections are a duplicate of detections that are associated with a primary/strong track. In some examples, the systems and techniques described herein can remove duplicate detections by determining the proximity or similarity between the unused detections and detections that may be associated with an already existing track (e.g., a primary/strong track).

At block 310, if the unused detection is a duplicate of one of the detection associated with a primary/strong track, the systems and techniques described herein can remove the duplicate detection from the set of unused detections for generating a secondary track.

At block 312, the systems and techniques described herein can spoof the kinematics for each detection. In some examples, the systems and techniques can determine kinematics of the detections by assuming an average velocity and/or a heading of the detected object. In some cases, the systems and techniques can determine kinematics of the detections by assuming a velocity and heading of the detected object that may result in a collision or a near miss with an AV. For example, the velocity and heading of the detected object towards the path of AV 102 can be predicted so that risk under the worst-case scenario can be conveyed in creating a secondary track.

At block 314, the systems and techniques described herein can generate a secondary track (e.g., a weak track) for the detections. In some examples, the secondary track can be represented in a probabilistic manner as opposed to definite primary/strong tracks. An AV system (e.g., localization stack 114, prediction stack 116, control stack 122, planning stack 118, etc.) can choose to respond and/or adjust the AV behavior differently based on the probability (or the degree of uncertainties), which can indicate the amount or level of risk that could potentially be involved.

Figure 4:
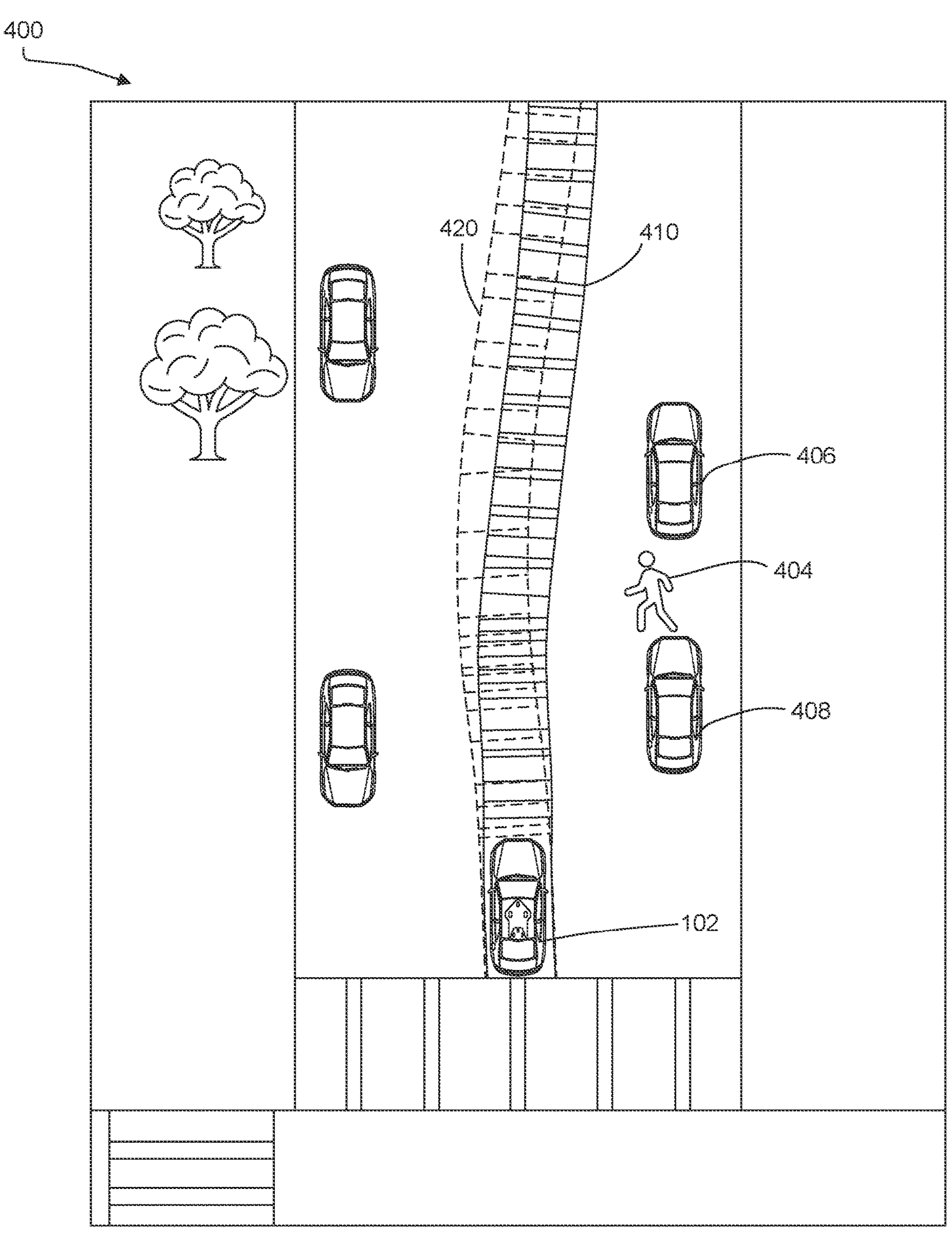
FIG. 4 illustrates a diagram illustrating an example secondary track generation, according to some examples of the present disclosure.

FIG. 4 illustrates a diagram illustrating an example secondary track generation 400. As shown in FIG. 4, while navigating on the road, AV 102 can collect, via sensor systems 104-108 such as a camera, a LiDAR sensor, and a RADAR sensor, sensor data that captures the driving environment near AV 102. For example, an object detector (e.g., detector 180 of AV 102) can detect first vehicle 406, second vehicle 408, and pedestrian 404 stepping out of an area between first vehicle 406 and second vehicle 408.

In some examples, as pedestrian 404 is stepping out from a narrow area between first vehicle 406 and second vehicle 408, a LiDAR sensor of AV 102 may not have many hits on pedestrian 404 so that the detection of pedestrian 404 by the LiDAR sensor at time t may have a low confidence score and not be used for association with a primary track until later when pedestrian 404 steps out further to get more hits by the LiDAR sensor at time t+k seconds.

In some examples, a perception system of AV 102 (e.g., perception stack 112 as illustrated in FIG. 1) can provide the unused detection of pedestrian 404 at time t to weak track mechanism 240 or process 300 of secondary track mechanism as described with respect to FIGS. 2 and 3 along with sensor data captured by other sensors at time t (e.g., image data from a camera, RADAR data from a RADAR sensor). In some examples, based on the unused detection of pedestrian via a secondary track mechanism, a secondary track of the partially occluded pedestrian 404 can be represented a couple of ticks sooner.

The early risk signal can allow AV 102 to start acting or adjusting the behavior sooner and prepare for a case that may pose a risk of safety-critical event (e.g., a collision or a near miss). For example, a planning system of AV 102 (e.g., planning stack 118) can replace original planned path 410 of AV 102 with adjusted planned path 420 based on the secondary track of pedestrian 404 to avoid a collision with pedestrian 404 or avoid a hard brake.

FIG. 5 illustrates a flowchart illustrating an example process 500 for generating a secondary track based on unused detections. Although the example process 500 depicts a particular sequence of operations, the sequence may be altered without departing from the scope of the present disclosure. For example, some of the operations depicted may be performed in parallel or in a different sequence that does not materially affect the function of process 500. In other examples, different components of an example device or system that implements process 500 may perform functions at substantially the same time or in a specific sequence.

At block 510, process 500 includes receiving unused sensor data collected by one or more sensors of an AV. In some examples, the unused sensor data is a remainder of sensor data that is used for generating a primary track of one or more objects. In some cases, the unused sensor data includes a detection of an object. For example, the systems and techniques described herein can receive unused sensor data collected by sensor systems 104-108 of AV 102.

In some examples, the sensor data is captured by one or more sensors of an AV (e.g., sensor systems 104-106 of AV 102 as illustrated 102) including at least one of a camera, a LiDAR sensor, and a RADAR sensor.

In some aspects, process 500 can include converting the sensor data captured by the two or more sensors of the AV into a common data format. For example, the systems and techniques described herein can convert various types of the sensor data collected from different sources/sensors into a common data representation.

At block 520, process 500 includes validating the object that is detected in the unused sensor data based on one or more parameters associated with the object. For example, the systems and techniques described herein can validate the object (e.g., pedestrian 404) that is detected in the unused sensor data based on one or more parameters including a confidence score, a semantic class of the object, a location of pedestrian 404 in relation to AV 102, and so on.

At block 530, process 500 includes comparing the object detected in the unused sensor data with the one or more objects of the primary track for similarity. For example, the systems and techniques described herein can compare the object (e.g., pedestrian 404) detected in the unused sensor data with the one or more objects of the primary track (e.g., detections that are associated with a strong/primary track through primary track mechanism 230) for similarity.

In some examples, process 500 can include determining whether the one or more objects of the primary track include the object detected in the unused sensor data. For example, the systems and techniques described herein can determine if pedestrian 404 detected in the unused sensor data is a duplicate of a detection associated with a primary/strong track.

At block 540, process 500 includes determining kinematics of the object based on a geometry of the object. For example, the systems and techniques described herein can determine predicted kinematics of pedestrian 404 based on, for example, a heading and velocity of pedestrian 404 towards a planned path of AV 102.

In some examples, when determining kinematics of the object, process 500 can include determining a risk of a collision between the object and the AV. For example, the systems and techniques described herein can determine risk of a safety critical event such as a collision between pedestrian 404 and AV 102 or a near miss.

At block 550, process 500 includes generating a secondary track of the object for localization of the AV. For example, the systems and techniques described herein can generate a secondary track of pedestrian 404 for localization of AV 102.

In some aspects, process 500 can include adjusting a behavior of the AV based on the secondary track of the object. For example, the systems and techniques described herein can adjust a behavior of AV 102 based on the secondary track of pedestrian 404.

In some examples, process 500 can include generating a probability associated with the secondary track of the object. For example, the systems and techniques described herein can generate a probability associated with the secondary track of pedestrian 404 to indicate the degree of uncertainties.

Figure 6:
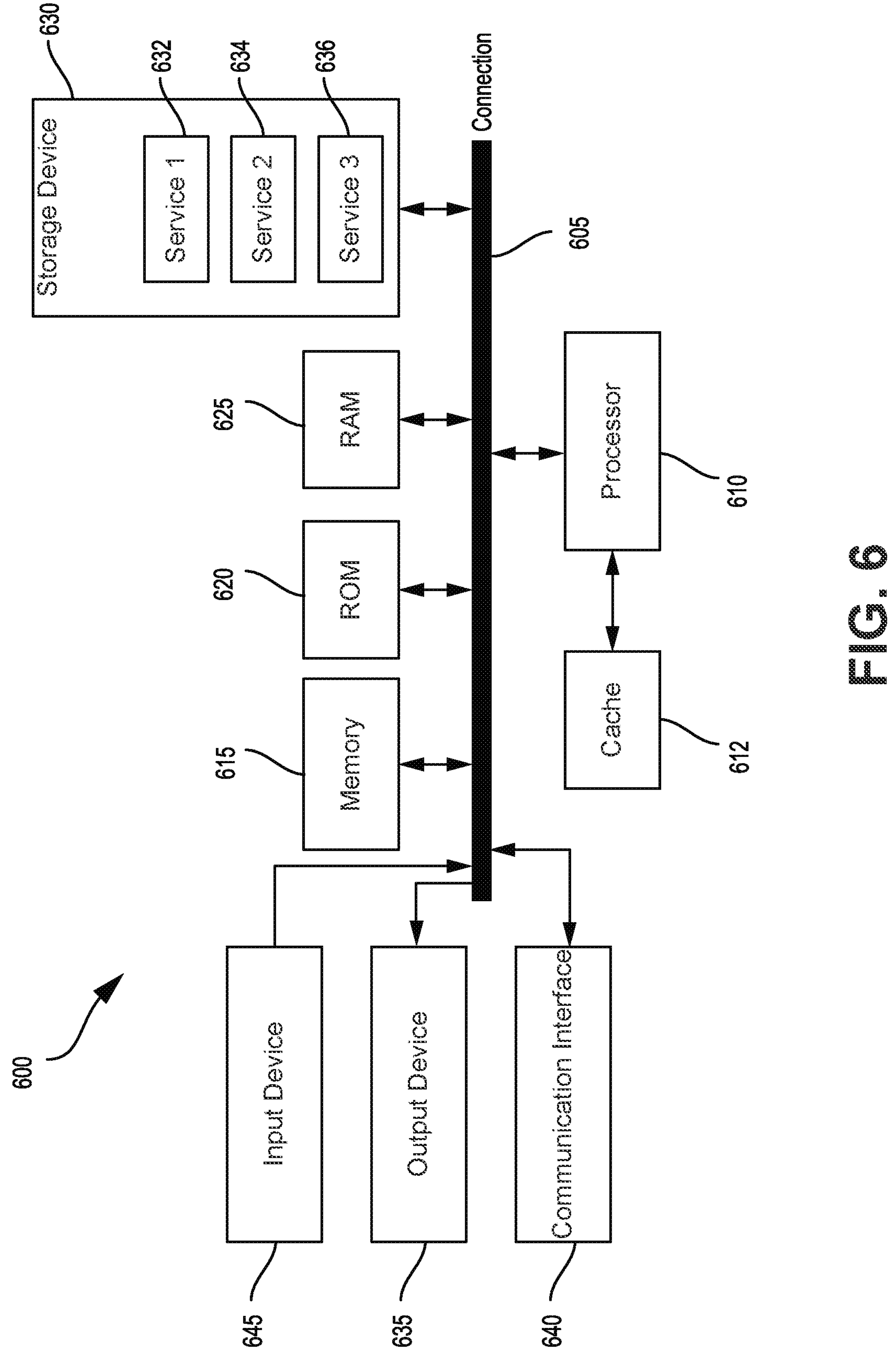
FIG. 6 illustrates a diagram illustrating an example system architecture for implementing certain aspects described herein.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communication interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some examples, a hardware service that performs a particular function can include the software component stored in a computer-readable medium in connection with the necessary hardware components, such as processor 610, connection 605, output device 635, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: receive unused sensor data collected by one or more sensors of an autonomous vehicle (AV), wherein the unused sensor data is a remainder of sensor data that is used for generating a primary track of one or more objects and wherein the unused sensor data includes a detection of an object; validate the object that is detected in the unused sensor data based on one or more parameters associated with the object; compare the object detected in the unused sensor data with the one or more objects of the primary track for similarity; determine kinematics of the object based on a geometry of the object; and generate a secondary track of the object for localization of the AV.

Aspect 2. The system of Aspect 1, wherein the unused sensor data includes sensor data captured by two or more sensors of the AV, wherein the one or more processors are configured to: convert the sensor data captured by the two or more sensors of the AV into a common data format.

Aspect 3. The system of Aspect 1 or 2, wherein the one or more processors are configured to: determine whether the one or more objects of the primary track include the object detected in the unused sensor data.

Aspect 4. The system of any of Aspects 1 to 3, wherein the one or more processors are configured to: adjust a behavior of the AV based on the secondary track of the object.

Aspect 5. The system of any of Aspects 1 to 4, wherein the one or more parameters associated with the object include at least one of a confidence score, a semantic class of the object, and a location of the object in relation to the AV.

Aspect 6. The system of any of Aspects 1 to 5, wherein determining the kinematics of the object includes determining a risk of a collision between the object and the AV.

Aspect 7. The system of any of Aspects 1 to 6, wherein the one or more processors are configured to: generate a probability associated with the secondary track of the object.

Aspect 8. The system of any of Aspects 1 to 7, wherein the one or more sensors of the AV include at least one of a camera, a Light Detection and Ranging (LiDAR) sensor, and a Radio Detection and Ranging (RADAR) sensor.

Aspect 9. A method comprising: receiving unused sensor data collected by one or more sensors of an autonomous vehicle (AV), wherein the unused sensor data is a remainder of sensor data that is used for generating a primary track of one or more objects and wherein the unused sensor data includes a detection of an object; validating the object that is detected in the unused sensor data based on one or more parameters associated with the object; comparing the object detected in the unused sensor data with the one or more objects of the primary track for similarity; determining kinematics of the object based on a geometry of the object; and generating a secondary track of the object for localization of the AV.

Aspect 10. The method of Aspect 9, wherein the unused sensor data includes sensor data captured by two or more sensors of the AV, the method further comprising: converting the sensor data captured by the two or more sensors of the AV into a common data format.

Aspect 11. The method of Aspect 9 or 10, further comprising: determine whether the one or more objects of the primary track include the object detected in the unused sensor data.

Aspect 12. The method of any of Aspects 9 to 11, further comprising: adjust a behavior of the AV based on the secondary track of the object.

Aspect 13. The method of any of Aspects 9 to 12, wherein the one or more parameters associated with the object include at least one of a confidence score, a semantic class of the object, and a location of the object in relation to the AV.

Aspect 14. The method of any of Aspects 9 to 13, wherein determining the kinematics of the object includes determining a risk of a collision between the object and the AV.

Aspect 15. The method of any of Aspects 9 to 14, further comprising: generate a probability associated with the secondary track of the object.

Aspect 16. The method of any of Aspects 9 to 15, wherein the one or more sensors of the AV include at least one of a camera, a Light Detection and Ranging (LiDAR) sensor, and a Radio Detection and Ranging (RADAR) sensor.

Aspect 17. A non-transitory computer-readable medium having stored thereon instructions which, when executed by one or more processors, cause the one or more processors to perform a method according to any of Aspects 9 to 16.

Aspect 18. A computer-program product having stored thereon instructions which, when executed by one or more processors, cause the one or more processors to perform a method according to any of Aspects 9 to 16.

Aspect 19. A system comprising means for performing a method according to any of Aspects 9 to 16.

Aspect 20. The system of Aspect 19, wherein the system comprises the AV.

What is claimed is:

1. A vehicle comprising:

a memory;

one or more sensors configured to detect objects proximal to the vehicle; and one or more processors coupled to the memory and the one or more sensors, the one or more processors being configured to:

receive sensor data collected by the one or more sensors of the vehicle, process the sensor data to identify a plurality of object detections, classify each of the plurality of object detections as a strong object detection or a weak object detection, generate a primary track of the objects using the strong object detections, and wherein unused sensor data comprises the weak object detections;

validate the weak object detections in the unused sensor data based on one or more parameters associated with the objects;

compare the weak object detections in the unused sensor data with the strong object detections generating the primary track for duplicates, and remove duplicate weak object detections from the unused sensor data;

determine kinematics of the objects associated with the weak object detections in the unused sensor data based on a geometry of the objects;

generate a secondary track of the objects from the unused sensor data;

calculate a probability that one or more of the objects are associated with the secondary track; and adjust localization of the vehicle based on one or more of the primary track, the secondary track, and the probability.

2. The system of claim 1, wherein the unused sensor data includes sensor data captured by two or more sensors of the vehicle, wherein the one or more processors are configured to:

convert the sensor data captured by the two or more sensors of the vehicle AV into a common data format.

3. The system of claim 1, wherein the one or more processors are configured to:

adjust a behavior of the vehicle based on the secondary track of the objects.

4. The system of claim 1, wherein the one or more parameters associated with the object include at least one of a confidence score, a semantic class of the object, and a location of the objects in relation to the vehicle.

5. The system of claim 1, wherein determining the kinematics of the object includes determining a risk of a collision between the objects and the vehicle.

6. The system of claim 1, wherein the one or more sensors of the vehicle include at least one of a camera, a Light Detection and Ranging (LiDAR) sensor, and a Radio Detection and Ranging (RADAR) sensor.

7. A method comprising:

receiving sensor data collected by one or more sensors of a vehicle, processing the sensor data to identify a plurality of object detections, classify each of the plurality of object detections as a strong object detection or a weak object detection, generating a primary track of the objects using the strong object detections, wherein unused sensor data comprises the weak object detections;

validating the weak object detections in the unused sensor data based on one or more parameters associated with the objects;

comparing the weak object detections in the unused sensor data with the strong object detections generating the primary track for duplicates, and remove duplicate weak object detections from the unused sensor data;

determining kinematics of the objects detected in the unused sensor data based on a geometry of the objects;

generating a secondary track of the objects from the unused sensor data;

calculating a probability that one or more of the objects are associated with the secondary track; and adjusting localization of the vehicle based on one or more of the primary track, the secondary track, and the probability.

8. The method of claim 7, wherein the unused sensor data includes sensor data captured by two or more sensors of the vehicle, the method further comprising:

converting the sensor data captured by the two or more sensors of the vehicle into a common data format.

9. The method of claim 7, further comprising:

adjust a behavior of the vehicle based on the secondary track of the objects.

10. The method of claim 7, wherein the one or more parameters associated with the object include at least one of a confidence score, a semantic class of the object, and a location of the objects in relation to the vehicle.

11. The method of claim 7, wherein determining the kinematics of the object includes determining a risk of a collision between the objects and the vehicle.

12. The method of claim 7, further comprising:

generate a probability associated with the secondary track of the objects.

13. The method of claim 7, wherein the one or more sensors of the vehicle include at least one of a camera, a Light Detection and Ranging (LiDAR) sensor, and a Radio Detection and Ranging (RADAR) sensor.

14. A non-transitory computer-readable medium having stored thereon instructions which, when executed by one or more processors, cause the one or more processors to:

receive sensor data collected by one or more sensors configured to detect objects proximal to a vehicle (AV), process the sensor data to identify a plurality of object detections, classify each of the plurality of object detections as a strong object detection or a weak object detection, generate a primary track of the objects using the strong object detections, and wherein unused sensor data comprises the weak object detections;

validate the weak object detections in the unused sensor data based on one or more parameters associated with the objects;

compare the weak object detections in the unused sensor data with the strong object detections generating the primary track for duplicates, and remove duplicate weak object detections from the unused sensor data;

determine kinematics of the objects associated with the weak object detections in the unused sensor data based on a geometry of the objects;

generate a secondary track of the objects from the unused sensor data;

calculate a probability that one or more of the objects are associated with the secondary track; and adjust localization of the vehicle based on one or more of the primary track, the secondary track, and the probability.

15. The non-transitory computer-readable medium of claim 14, comprising further instructions configured to cause the one or more processors to:

adjust a behavior of the vehicle based on the secondary track of the objects.

16. The non-transitory computer-readable medium of claim 14, wherein the one or more parameters associated with the object include at least one of a confidence score, a semantic class of the object, and a location of the objects in relation to the vehicle.

17. The non-transitory computer-readable medium of claim 14, wherein determining the kinematics of the objects includes determining a risk of a collision between the object and the vehicle.

* * * * *